US007538537B2

(12) United States Patent
Minakuchi et al.

(10) Patent No.: US 7,538,537 B2

(45) Date of Patent: *May 26, 2009

(54) CONSTANT-VOLTAGE CIRCUIT AND CONTROLLING METHOD THEREOF

(75) Inventors: Yusuke Minakuchi, Nara (JP); Yoshiki Takagi, Hyogo (JP)

(73) Assignees: Ricoh Company, Ltd., Tokyo (JP); Analog Research Limited, Nara (JP)

(*) Notice: Subject to any disclaimer, the term of this patent is extended or adjusted under 35 U.S.C. 154(b) by 92 days.

This patent is subject to a terminal disclaimer.

(21) Appl. No.: 11/585,453

(22) Filed: Oct. 23, 2006

(65) Prior Publication Data

US 2007/0108958 A1 May 17, 2007

(30) Foreign Application Priority Data

Nov. 11, 2005 (JP) ............................ 2005-327739

(51) Int. Cl.

*G05F 3/16* (2006.01)
*G05F 3/20* (2006.01)
*G05F 1/00* (2006.01)
*H02M 7/00* (2006.01)

(52) U.S. Cl. ....................... 323/316; 323/280; 323/282; 323/370; 363/13

(58) Field of Classification Search ......... 323/303–304, 323/311–316, 370; 363/13

See application file for complete search history.

(56) References Cited

U.S. PATENT DOCUMENTS 6,236,195 B1 * 5/2001 Nagatomo .................. 323/303
6,617,833 B1 * 9/2003 Xi .............................. 323/282
7,202,655 B2 * 4/2007 Itoh ........................... 323/316
2002/0113652 A1 * 8/2002 Uto et al. ..................... 330/259
2005/0231180 A1 * 10/2005 Nagata et al. ............... 323/268

FOREIGN PATENT DOCUMENTS

| | | |
|---|---|---|
| JP | 2000-47740 | 2/2000 |
| JP | 2000-242344 | 9/2000 |
| JP | 2001-296930 | 10/2001 |
| JP | 2005-316959 | 11/2005 |

OTHER PUBLICATIONS

Mar. 26, 2008 Korean official action (with English translation) in connection with corresponding Korean patent application No. 10-2006-0109853.

Nov. 28, 2008 official action in connection with a counterpart Chinese patent application No. 200610171854.1.

* cited by examiner

*Primary Examiner*—Akm E Ullah
*Assistant Examiner*—Johali A Torres Ruiz
(74) *Attorney, Agent, or Firm*—Cooper & Dunham, LLP

(57) ABSTRACT

A constant-voltage circuit in which a response speed for a sudden change of an input voltage or a sudden change of a load current can be fast are disclosed. In normal operating conditions, a first control circuit (error amplifier circuit) having an excellent direct-current characteristic controls operations of an output voltage control transistor and an output voltage is made a constant voltage. When the output voltage is suddenly decreased, before the first control circuit controls the operations of the output voltage control transistor by responding to the sudden decrease of the output voltage, an amplifier circuit having a high-speed response characteristic amplifies the change of the output voltage, and when the amplified voltage obtained by the amplification is suddenly decreased, a second control circuit controls the operations of the output voltage control transistor for a predetermined period. With this, the output voltage can be a constant voltage.

15 Claims, 3 Drawing Sheets

CONSTANT-VOLTAGE CIRCUIT AND CONTROLLING METHOD THEREOF

BACKGROUND

1. Technical Field

This disclosure generally relates to a constant-voltage circuit and a controlling method thereof in which a response speed can be fast and overshooting of an output voltage from the circuit and an oscillation of the circuit are restrained when the output voltage is suddenly decreased caused by a change of a load to the circuit.

2. Description of the Related Art

Generally, an error amplifier in a constant-voltage circuit provides a frequency compensation circuit which performs phase compensation in order to avoid unstable operations such as an oscillation of the circuit.

FIG. 3 is a circuit diagram of a constant-voltage circuit.

In a constant-voltage circuit 100 shown in FIG. 3, an error amplifier AMPa provides NMOS transistors M103 and M104 which form a differential pair, PMOS transistors M105 and M106 which form a current mirror circuit and become a load to the differential pair, and an NMOS transistor M102 which is a constant-current source for supplying a bias current to the differential pair. Further, the error amplifier AMPa provides an output circuit section formed of a PMOS transistor M107 and an NMOS transistor M108 and a frequency compensation circuit formed of a resistor R103 and a capacitor C101.

In the error amplifier AMPa, an output voltage Vout is divided by resistors R101 and R102 so that a divided voltage VFBa is input to the gate of the NMOS transistor M104 which gate is a non-inverting input terminal. A predetermined reference voltage Vs from a reference voltage generating circuit 101 is input to the gate of the NMOS transistor M103 which gate is an inverting input terminal. The error amplifier AMPa controls operations of an output voltage control transistor M101 so that the divided voltage VFBa becomes the reference voltage Vs and controls a current to be output to a load from the output voltage control transistor M101.

Generally, the error amplifier AMPa in the constant-voltage circuit 100 is designed so that a direct-current characteristic becomes excellent. Therefore, a direct-current gain is designed to be as large as possible; consequently, a bias current which is supplied to the differential pair is determined to be small. Accordingly, it takes time to charge/discharge the capacitor C101 for frequency compensation and input capacitance of the output voltage control transistor M101. Consequently, a response speed for a sudden change of an input voltage Vin and for a sudden change of a load current becomes slow.

In order to solve the above problem, a method is disclosed in which method a decrease of an output voltage caused by a sudden increase of a load current is rapidly compensated for. In the method, only alternating-current components of the change of the output voltage are detected by a coupling capacitor, a current is supplied to a load from a power source voltage by an auxiliary transistor which is separately disposed from the output transistor. With this, the decrease of the output voltage is compensated for. The method is disclosed in, for example, Patent Documents 1 and 2.

[Patent Document 1] Japanese Laid-Open Patent Application No. 2000-47740

[Patent Document 2] Japanese Laid-Open Patent Application No. 2000-242344

However, in the above method, since there is a limitation in detecting the speed of the change of the output voltage, the decrease of the output voltage caused by the change of the load cannot be sufficiently restrained.

SUMMARY

In a preferred embodiment of the present invention, there is provided a constant-voltage circuit and a controlling method thereof in which a response speed for a sudden change of an input voltage or a sudden change of a load current can be fast.

Features and advantages of the present invention are set forth in the description that follows, and in part will become apparent from the description and the accompanying drawings, or may be learned by practice of the invention according to the teachings provided in the description. Features and advantages of the present invention will be realized and attained by a constant-voltage circuit and a controlling method thereof particularly pointed out in the specification in such full, clear, concise, and exact terms as to enable a person having ordinary skill in the art to practice the invention.

In an aspect of this disclosure, there is provided a constant-voltage circuit which converts an input voltage input to an input terminal into a predetermined constant voltage and outputs the predetermined constant voltage from an output terminal. The constant-voltage circuit includes an output voltage control transistor which outputs a current corresponding to an input control signal to the output terminal, and a control circuit section which detects a voltage of the output terminal and controls operations of the output voltage control transistor so that the detected voltage becomes a predetermined voltage. The control circuit section amplifies a change of the voltage output from the output terminal, and makes the output voltage control transistor increase the output current for a predetermined period when the voltage of a signal obtained by amplification of the change is suddenly decreased at a speed more than a predetermined speed.

Specifically, the control circuit section includes a reference voltage generating circuit section which generates a predetermined reference voltage and outputs the predetermined reference voltage, an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change, and a second control circuit section which makes the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal.

In addition, the amplifier circuit section detects alternating-current components of the change of the voltage output from the output terminal, amplifies the detected alternating-current components, and outputs the amplified components.

In addition, the amplifier circuit section includes a first differential amplifier circuit to whose first input terminal a predetermined first bias voltage is input and which outputs a signal to the second control circuit section so that a voltage of a second input terminal becomes the predetermined first bias voltage, a first capacitor connected between the second input terminal of the first differential amplifier circuit and the output terminal, and a first resistor connected between the first and second input terminals of the first differential amplifier circuit.

In addition, the first differential amplifier circuit includes transistors which form a differential pair and an offset value is set in at least one of the transistors, so that when the change of the voltage of the output terminal is a predetermined value or less, a current flowing into one transistor becomes smaller than a current flowing into the other transistor.

In addition, the offset value of the transistor in the first differential amplifier circuit is corrected so that dispersion of the response speed of the amplifier circuit section caused by dispersion properties of elements of the amplifier circuit section in manufacturing processes is corrected.

In addition, the second control circuit section includes a second differential amplifier circuit to whose first input terminal a predetermined first bias voltage is input and which controls the output voltage control transistor so that a voltage of a second input terminal becomes the predetermined first bias voltage, a second capacitor connected between the second input terminal of the second differential amplifier circuit and the output terminal of the amplifier circuit section, and a second resistor connected between the first and second input terminals of the second differential amplifier circuit.

In addition, the second differential amplifier circuit includes transistors which form a differential pair and an offset value is set in at least one of the transistors, so that when the change of the voltage of the output terminal is a predetermined value or less, a current flowing into one transistor becomes smaller than a current flowing into the other transistor.

In addition, the output voltage control transistor and the control circuit section are integrated into one IC.

In addition, the control circuit section is integrated into one IC.

According to another aspect of this disclosure, there is provided a controlling method of a constant-voltage circuit which includes an output voltage control transistor for outputting a current corresponding to an input control signal to an output terminal of the constant-voltage circuit, and a control circuit section for detecting a voltage of the output terminal and for controlling operations of the output voltage control transistor so that the detected voltage becomes a predetermined voltage, converts an input voltage input to an input terminal into a predetermined constant voltage, and outputs the predetermined constant voltage from the output terminal. The controlling method of the constant-voltage circuit includes the steps of amplifying a change of the voltage output from the output terminal, and making the output voltage control transistor increase the output current for a predetermined period when the voltage of a signal obtained by amplification of the change is suddenly decreased at a speed more than a predetermined speed.

Specifically, alternating-current components of the change of the voltage output from the output terminal are detected, and the change of the voltage output from the output terminal is amplified by amplifying the detected alternating-current components.

In addition, alternating-current components of the change of the voltage of the signal obtained by amplification are detected, and when a sudden decrease of the voltage of the signal obtained by amplification at a speed more than a predetermined speed is detected from the detected alternating-current components, the output voltage control transistor is made to increase the output current for a predetermined period.

According to an embodiment of this disclosure, in a constant-voltage circuit and a method thereof, a change of a voltage output from an output terminal of the constant-voltage circuit is amplified, and when a voltage of a signal obtained by the amplification of the change of the voltage is rapidly decreased at a speed more than a predetermined speed, an output voltage control transistor is made to increase an output current for a predetermined period. Therefore, the decrease of the output voltage caused by a change of a load and so on can be restrained in an early stage. That is, the decrease of the output voltage caused by a sudden change of an input voltage or a sudden change of a load current can be greatly restrained.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENT

[Best Mode of Carrying Out the Invention]

A best mode of carrying out the present invention is described with reference to the accompanying drawings.

Figure 1:
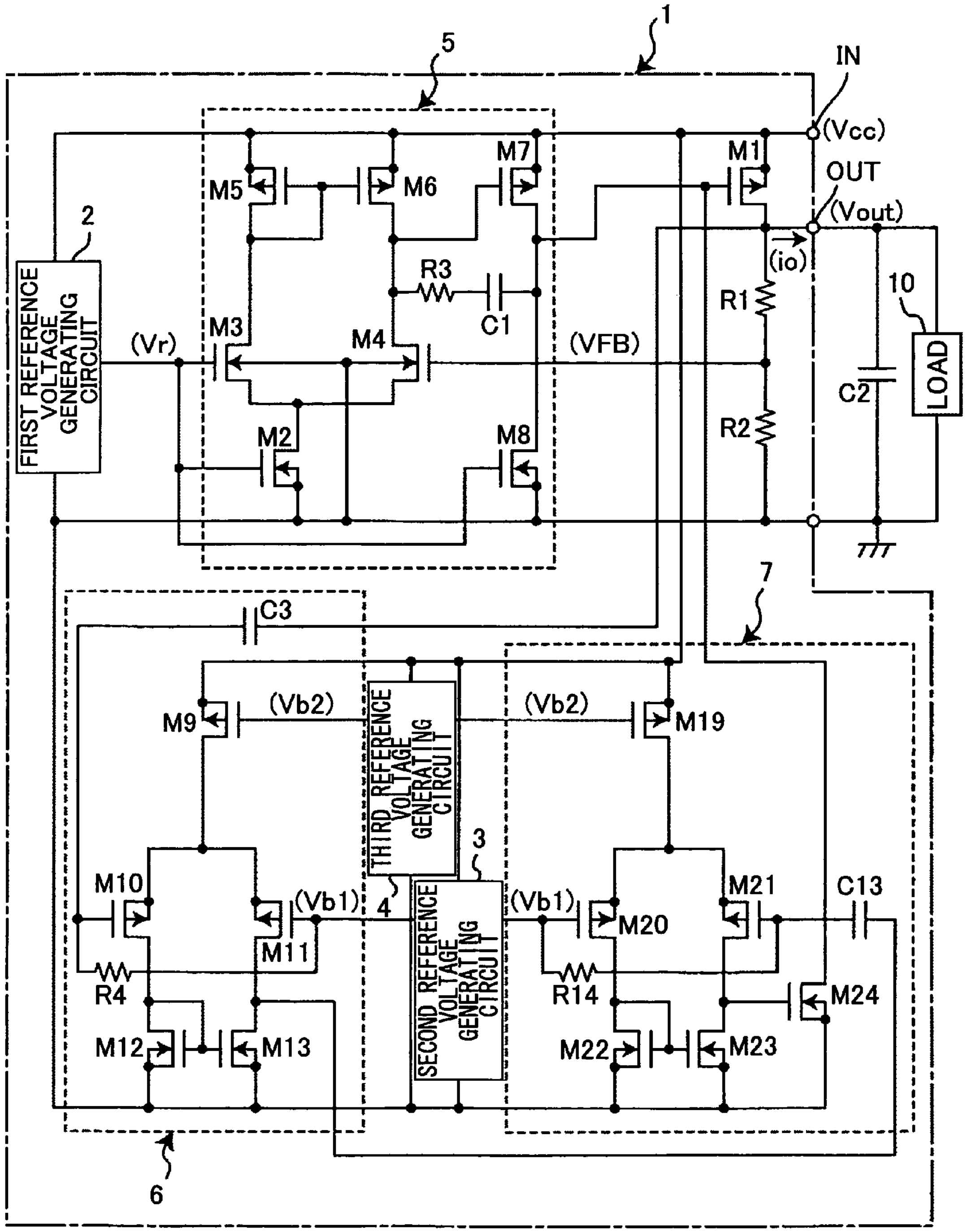
FIG. 1 is a circuit diagram of a constant-voltage circuit according to an embodiment of the present invention.

FIG. 1 is a circuit diagram of a constant-voltage circuit according to an embodiment of the present invention.

In FIG. 1, a constant-voltage circuit 1 generates a predetermined constant voltage from a power source voltage Vcc which is an input voltage and outputs the generated voltage from an output terminal OUT as an output voltage Vout. A load 10 and a capacitor C2 are connected in parallel between the output terminal OUT and ground potential.

The constant-voltage circuit 1 includes a first reference voltage generating circuit 2 which generates a predetermined reference voltage Vr and outputs the generated voltage Vr, a second reference voltage generating circuit 3 which generates a predetermined first bias voltage Vb1 and outputs the generated voltage Vb1, and a third reference voltage generating circuit 4 which generates a predetermined second bias voltage Vb2 and outputs the generated voltage Vb2. Further, the constant-voltage circuit 1 includes resistors R1 and R2 (output voltage detecting resistors) which divide the output voltage Vout, generate a divided voltage VFB, and output the divided voltage VFB; an output voltage control PMOS transistor M1 which controls a current io which is output to the output terminal OUT based on a signal input to the gate of the transistor M1; and a first control circuit 5 which is an error amplifier circuit for controlling operations of the output voltage control transistor M1 so that the divided voltage VFB becomes the reference voltage Vr.

In addition, the constant-voltage circuit 1 includes an amplifier circuit 6 which amplifies a transitional change of the output voltage Vout and outputs a signal of the amplified change, and a second control circuit 7 which is an error amplifier circuit. When a voltage of the signal output from the amplifier circuit 6 is changed more rapidly than a predetermined speed, the second control circuit 7 controls operations of the output voltage control transistor M1 for a predetermined period. That is, for example, when an output current io is suddenly increased and the output voltage Vout is suddenly decreased, the second control circuit 7 controls the operations of the output voltage control transistor M1 for a predetermined period. The operations of the output voltage control transistor M1 are controlled by signals output from the first control circuit 5 and the second control circuit 7. The constant-voltage circuit 1 can be integrated into one IC or another IC from which the output voltage control transistor M1 is excluded.

The output voltage control transistor M1 is connected between an input terminal IN and the output terminal OUT, and output terminals of the first control circuit 5 and the second control circuit 7 are connected to the gate of the output voltage control transistor M1. A series circuit of the resistors R1 and R2 is connected between the output terminal OUT and ground potential, and the divided voltage VFB is output from a connection point of the resistor R1 with the resistor R2.

The first control circuit 5 includes NMOS transistors M2, M3, M4, and M8, PMOS transistors M5, M6, and M7, a capacitor C1, and a resistor R3. The amplifier circuit 6 includes PMOS transistors M9, M10, M11, NMOS transistors M12 and M13, a capacitor C3, and a resistor R4. The second control circuit 7 includes PMOS transistors M19, M20, M21, NMOS transistors M22, M23, and M24, a capacitor C13, and a resistor R14.

The NMOS transistors M3 and M4 form a differential pair, and the PMOS transistors M5 and M6 form a current mirror circuit and become a load for the differential pair. The sources of the PMOS transistors M5 and M6 are connected to the input terminal IN, the gates of the PMOS transistors M5 and M6 are connected to a connection point and the connection point is connected to the drain of the PMOS transistor M5. The drain of the PMOS transistor M5 is connected to the drain of the NMOS transistor M3, and the drain of the PMOS transistor M6 is connected to the drain of the NMOS transistor M4. The sources of the NMOS transistors M3 and M4 are connected to a connection point and the NMOS transistor M2 is connected between the connection point and ground potential.

The first reference voltage generating circuit 2 is operated by the power source voltage Vcc, the reference voltage Vr is input to the gates of the NMOS transistors M2 and M3, and the NMOS transistor M2 becomes a constant-current voltage source. The divided voltage VFB is input to the gate of the NMOS transistor M4.

The PMOS transistor M7 and the NMOS transistor M8 are connected in series between the input terminal IN and ground potential, a connection point of the PMOS transistor M7 with the NMOS transistor M8 is an output terminal of the first control circuit 5, and the connection point is connected to the gate of the output voltage control transistor M1. The gate of the PMOS transistor M7 is connected to a connection point of the PMOS transistor M6 with the NMOS transistor M4, the reference voltage Vr is input to the gate of the NMOS transistor M8, and the NMOS transistor M8 becomes a constant-current source. The capacitor C1 for frequency compensation and the resistor R3 are connected in series between the connection point of the PMOS transistor M6 with the NMOS transistor M4 and the connection point of the PMOS transistor M7 with the NMOS transistor M8.

In the amplifier circuit 6, the PMOS transistors M10 and M11 form a differential pair, and the NMOS transistors M12 and M13 form a current mirror circuit and become a load for the differential pair. The sources of the NMOS transistors M12 and M13 are connected to ground potential, the gates of the NMOS transistors M12 and M13 are connected to a connection point and the connection point is connected to the drain of the NMOS transistor M12. The drain of the NMOS transistor M12 is connected to the drain of the PMOS transistor M10, and the drain of the NMOS transistor M13 is connected to the drain of the PMOS transistor M11. The sources of the PMOS transistors M10 and M11 are connected to a connection point and the PMOS transistor M9 is connected between the connection point and the input terminal IN.

The second reference voltage generating circuit 2 and the third reference voltage generating circuit 3 are operated by the power source voltage Vcc, and the second bias voltage Vb2 is input to the gate of the PMOS transistor M9 and the first bias voltage Vb1 is input to the gate of the PMOS transistor M11. The PMOS transistor M9 becomes a constant-current source. The capacitor C3 is connected between the gate of the PMOS transistor M10 and the output terminal OUT, and the first bias voltage Vb1 is input to a connection point of the gate of the PMOS transistor M10 with the capacitor C3 via the resistor R4. A connection point of the PMOS transistor M11 with the NMOS transistor M13 is an output terminal of the amplifier circuit 6.

In the second control circuit 7, the PMOS transistors M20 and M21 form a differential pair, and the NMOS transistors M22 and M23 form a current mirror circuit and become a load for the differential pair. The sources of the NMOS transistors M22 and M23 are connected to ground potential, the gates of the NMOS transistors M22 and M23 are connected to a connection point and the connection point is connected to the drain of the NMOS transistor M22. The drain of the NMOS transistor M22 is connected to the drain of the PMOS transistor M20, and the drain of the NMOS transistor M23 is connected to the drain of the PMOS transistor M21. The sources of the PMOS transistors M20 and M21 are connected to a connection point and the PMOS transistor M19 is connected between the connection point and the input terminal IN.

The second bias voltage Vb2 is input to the gate of the PMOS transistor M19 and the first bias voltage Vb1 is input to the gate of the PMOS transistor M20. The PMOS transistor M19 becomes a constant-current source. The capacitor C13 is connected between the gate of the PMOS transistor M21 and the output terminal of the amplifier circuit 6, and the first bias voltage Vb1 is input to a connection point of the gate of the PMOS transistor M21 with the capacitor C13 via the resistor R14. The NMOS transistor M24 is connected between the gate of the output voltage control transistor M1 and ground potential, the gate of the NMOS transistor M24 is connected to a connection point of the drain of the PMOS transistor M21 with the drain of the NMOS transistor M23, and the drain of the NMOS transistor 24 is an output terminal of the second control circuit 7 and is connected to the gate of the output voltage control transistor M1.

The first reference voltage generating circuit 2, the second reference voltage generating circuit 3, the third reference voltage generating circuit 4, the first control circuit 5, the amplifier circuit 6, the second control circuit 7, and the resistors R1 and R2 form a control circuit section. In addition, the first reference voltage generating circuit 2 is a reference voltage generating circuit section, the resistors R1 and R2 form an output voltage detecting circuit section, and the first control circuit 5 forms a first control circuit section. Further, the amplifier circuit 6, the second reference voltage generating circuit 3, and the third reference voltage generating circuit 4 form an amplifier circuit section, and the second control circuit 7 forms a second control circuit section. The second control circuit section can includes the second control circuit 7, the second reference voltage generating circuit 3, and the third reference voltage generating circuit 4.

In addition, the PMOS transistors M9, M10, and M11, and the NMOS transistors M12 and M13 form a first differential amplifier circuit. The first differential amplifier circuit can further include the second reference voltage generating circuit 3 and the third reference voltage generating circuit 4. The capacitor C3 is a first capacitor and the resistor R4 is a first fixed resistor. Further, the PMOS transistors M19, M20, and M21, and the NMOS transistors M22 and M23 form a second differential amplifier circuit. The second differential amplifier circuit can further include the second reference voltage generating circuit 3 and the third reference voltage generating circuit 4. The capacitor C13 is a second capacitor and the resistor R14 is a second fixed resistor.

In the above structure, the first control circuit 5 (error amplifier circuit) is designed so that the drain current of the NMOS transistor M2 (constant-current source) becomes as small as possible so as to achieve an excellent direct-current characteristic in which the direct-current gain becomes as large as possible. The amplifier circuit 6 is designed so that the drain current of the PMOS transistor M9 (constant-current source) becomes as large as possible so as to achieve high-speed operations. In addition, in the amplifier circuit 6, since the gate of the PMOS transistor M10 which is the input terminal of the amplifier circuit 6 is connected to the output terminal OUT via the capacitor C3 which is a coupling capacitor, only alternating-current components of the output voltage Vout can be amplified. In at least one of the PMOS transistors M10 and M11, an offset value is set, so that when the same voltage is input to the gates of the PMOS transistors M10 and M11, for example, the PMOS transistor M11 outputs a relatively large current; however, the PMOS transistor M10 outputs only a very small current. As a result, in normal operating conditions, the voltage of the output terminal of the amplifier circuit 6 becomes almost the same as the drain voltage of the PMOS transistor M9.

When the output voltage Vout is suddenly changed, for example, the output voltage Vout is suddenly decreased caused by a sudden increase of the output current io, the amplifier circuit 6 amplifies a signal of the change of the output voltage Vout, that is, the amplifier circuit 6 performs amplifying operations.

The amplifying operations of the amplifier circuit 6 are described in detail. When a current flowing into the load 10 is suddenly increased and the output voltage Vout is suddenly decreased, the amplifier circuit 6 responds to the situation before the first control circuit 5 operates to make the output voltage control transistor M1 increase the output current io. That is, in the amplifier circuit 6, when the output voltage Vout is suddenly decreased, the gate voltage of the PMOS transistor M10 is decreased via the capacitor C3, the drain current of the PMOS transistor M10 is increased, and the gate voltage of the NMOS transistor M12 is increased.

Consequently, the drain current of the NMOS transistor M13 is increased and the voltage of the connection point of the PMOS transistor M11 with the NMOS transistor M13 is decreased, that is, the voltage of the output terminal of the amplifier circuit 6 is decreased. As described above, the decrease of the output voltage Vout is converted into the decrease of the voltage at the output terminal of the amplifier circuit 6 by being amplified.

On the other hand, in the second control circuit 7, since the gate of the PMOS transistor M21 which gate is the input terminal of the second control circuit 7 is connected to the output terminal of the amplifier circuit 6 via the capacitor C13 (coupling capacitor), the second control circuit 7 can amplify only alternating-current components of the signal output from the amplifier circuit 6.

In at least one of the PMOS transistors M20 and M21, an offset value is set, so that when the same voltage is input to the gates of the PMOS transistors M20 and M21, for example, the PMOS transistor M20 outputs a relatively large current; however, the PMOS transistor M21 outputs only a very small current. As a result, in normal operating conditions, the voltage of the gate of the NMOS transistor M24 becomes almost the same as ground potential.

The second control circuit 7 is designed so that the drain current of the PMOS transistor M19 which is the constant-current source is as large as possible so as to achieve high-speed operations. When an output signal from the amplifier circuit 6 is suddenly changed, for example, the voltage of the output signal from the amplifier circuit 6 is suddenly decreased, the second control circuit 7 controls the operations of the output voltage control transistor M1 for a predetermined period. That is, the second control circuit 7 controls the operations of the output voltage control transistor M1 by responding at a high speed to the sudden decrease of the voltage of the output signal from the amplifier circuit 6 and increases the output voltage Vout.

Operations of a case are described in detail in which case the output voltage Vout is suddenly decreased caused by a sudden increase of a current flowing into the load 10.

When the output voltage Vout is suddenly decreased, in the first control circuit 5, since the response speed for the sudden change of the output voltage Vout is slow, it takes time to make the output voltage control transistor M1 increase an output current. On the other hand, since the amplifier circuit 6 can respond at a high speed for the sudden change of the output voltage Vout, when the output voltage Vout is suddenly decreased, first, only the amplifier circuit 6 responds to the situation and the decrease of the output voltage Vout is converted into the voltage decrease at the output terminal of the amplifier circuit 6 by being amplified.

On the other hand, in the second control circuit 7, when the voltage of the output signal from the amplifier circuit 6 is suddenly decreased, the gate voltage of the PMOS transistor M21 is decreased via the capacitor C13, the drain current of the PMOS transistor M21 is increased, and the gate voltage of the NMOS transistor M24 is increased. Consequently, the drain current of the NMOS transistor M24 is increased, the gate voltage of the output voltage control transistor M1 is decreased, and the drain current of the output voltage control transistor M1 is increased. With this, the decrease of the output voltage Vout caused by the increase of the output current io is restrained. As described above, the gate of the output voltage control transistor M1 can be driven at an early stage of the decrease of the output voltage Vout and the decrease of the output voltage Vout can be greatly restrained.

Next, a constant of each element is described in detail.

Due to a time constant of the resistor R4 and the capacitor C3, the gate voltage of the PMOS transistor M10 becomes the same voltage as the first bias voltage Vb1 in a certain period after the sudden decrease of the output voltage Vout. When the time constant of the resistor R4 and the capacitor C3 becomes large, the response characteristic of the amplifier circuit 6 for the change of the output voltage Vout becomes excellent, and when the time constant becomes small, the response characteristic of the amplifier circuit 6 for the change of the output voltage Vout becomes worse. Therefore, by considering other factors such as a layout area of the circuit, for example, it is determined that the resistance of the resistor R4 is approximately 2 MΩ and the capacitance of the capacitor C3 is approximately 5 pF.

When an offset value of the differential pair of the PMOS transistors M10 and M11 in the amplifier circuit 6 is studied, the sizes of the PMOS transistor M10 and M11 are determined as follows. That is, it is determined that the gate width W of the PMOS transistor M10 is approximately 32 μm and the gate length L of the PMOS transistor M10 is approximately 2 μm, and the gate width W of the PMOS transistor M11 is approximately 40 μm and the gate length L of the PMOS transistor M11 is approximately 2 μm. That is, the ratio between the sizes of the PMOS transistors M10 and M11 is determined as approximately 8:10.

In addition, due to a time constant of the resistor R14 and the capacitor C13, the gate voltage of the PMOS transistor M21 becomes the same voltage as the first bias voltage Vb1 in a certain period after the sudden decrease of the output voltage of the amplifier circuit 6. When the time constant of the resistor R14 and the capacitor C13 becomes large, the response characteristic of the second control circuit 7 for the change of the output voltage of the amplifier circuit 6 becomes excellent, and when the time constant becomes small, the response characteristic of the second control circuit 7 for the change of the output voltage of the amplifier circuit 6 becomes worse. Therefore, by considering other factors such as a layout area of the circuit, for example, it is determined that the resistance of the resistor R14 is approximately 2 MΩ and the capacitance of the capacitor C13 is approximately 5 pF.

In at least one of the PMOS transistors M20 and M21 which form the differential pair, an offset value is set, so that when the same voltage is input to the gates of the PMOS transistors M20 and M21, for example, the PMOS transistor M20 outputs a relatively large current; however, the PMOS transistor M21 outputs only a very small current.

When an offset value of the differential pair of the PMOS transistors M20 and M21 in the second control circuit 7 is studied, the sizes of the PMOS transistor M20 and M21 are determined as follows. That is, it is determined that the gate width W of the PMOS transistor M20 is approximately 40 μm and the gate length L of the PMOS transistor M20 is approximately 2 μm, and the gate width W of the PMOS transistor M21 is approximately 32 μm and the gate length L of the PMOS transistor M21 is approximately 2 μm. That is, the ratio between the sizes of the PMOS transistors M20 and M21 is determined as approximately 10:8.

When the output voltage Vout is not suddenly decreased, the NMOS transistor M24 does not control the operations of the output voltage control transistor M1. That is, in normal operating conditions, the second control circuit 7 does not influence the operations of the output voltage control transistor M1 due to the control by the first control circuit 5.

As discussed above, the constant of each element is ideally determined at a designing stage of the circuit, and the dispersion of the values of the elements in the manufacturing processes is not considered. Changes of the values of the resistor R4 and the capacitor C3 and the dispersion of the offset values of the PMOS transistors M10 and M11 affect the response speed of the amplifier circuit 6 and the stability of the output voltage Vout.

In order to solve the problem, the influence caused by the dispersion of the values of the elements in the manufacturing processes can be decreased by correcting the offset values of the PMOS transistors M10 and M11. For example, when the values of the resistor R4 and the capacitor C3 are dispersed to increase, in order to decrease the response speed, the offset values of the PMOS transistors M10 and M11 are corrected to increase. Consequently, stable operations of the constant-voltage circuit 1 can be performed while maintaining predetermined response speed.

As described above, in the constant-voltage circuit 1 according to the embodiment of the present invention, in normal operating conditions, the first control circuit 5 which is the error amplifier circuit having an excellent direct-current characteristic controls the operations of the output voltage control transistor M1; with this, the output voltage Vout can be stabilized. When the output voltage Vout is suddenly decreased, before the first control circuit 5 controls the operations of the output voltage control transistor M1 by responding to the sudden decrease of the output voltage Vout, the amplifier circuit 6 having a high-speed response characteristic amplifies the change of the output voltage Vout; when the voltage of the signal obtained by the amplification is suddenly decreased, the second control circuit 7 controls the operations of the output voltage control transistor M1 for a predetermined period. With this, the output voltage Vout is stabilized.

Figure 2:
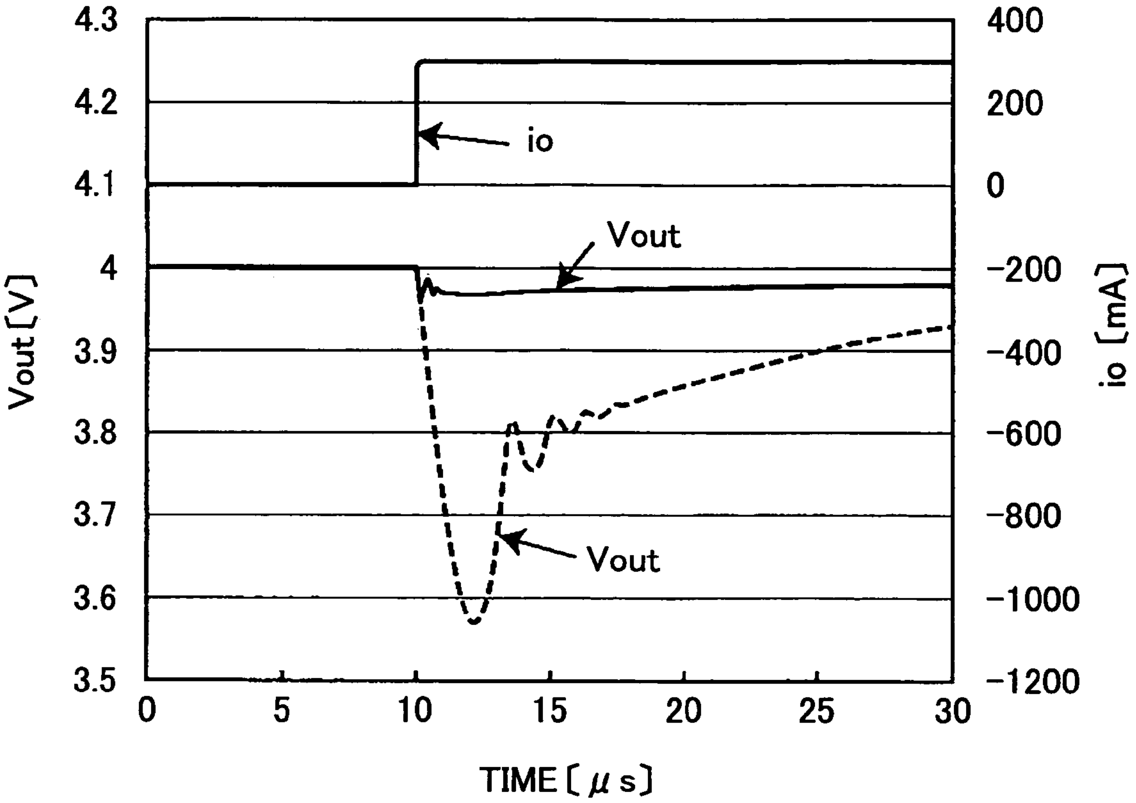
FIG. 2 is a graph showing relationships among output voltages, a current flowing into an output terminal in constant-voltage circuits, and time.
Figure 3:
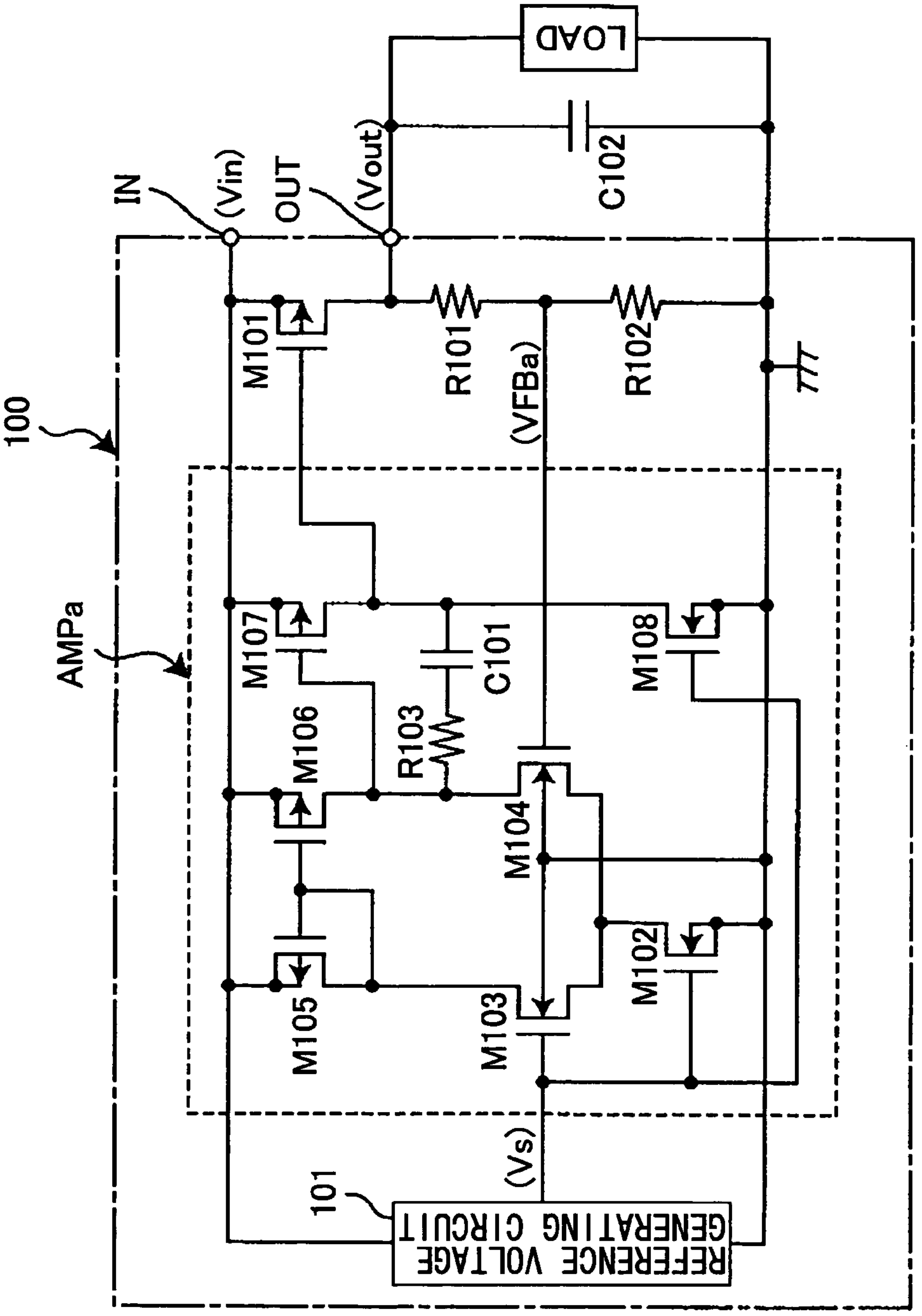
FIG. 3 is a circuit diagram of a constant-voltage circuit.

Next, a case is studied in which case, for example, the power source voltage Vcc is 5 V, the rated value of the output voltage Vout is 4 V, and the capacitance of the capacitor c2 is 1 μF. In this case, when a current (output current io) flowing into the load 10 is increased from 0 mA to 300 mA for 500 ns, as shown in the dashed line of FIG. 2, in the constant-voltage circuit (existing circuit) shown in FIG. 3, the output voltage Vout is decreased by approximately 400 mV, and even if an existing method is used which method rapidly corrects the decrease of the output voltage Vout caused by the sudden increase of the load current, the output voltage Vout recovers from the approximately 400 mV decrease to an approximately 70 mV decrease. However, according to the embodiment of the present invention, as shown in the continuous line of FIG. 2, the decrease of the output voltage Vout can be restrained to approximately 35 mV. FIG. 2 is a graph showing relationships among the output voltage Vout, the output current io, and time.

As described above, according to the embodiment of the present invention, a response speed for a sudden change of an output voltage caused by a sudden change of an input voltage or a sudden change of a load current can be faster than before. Therefore, when the load current experiences a large transient change, the decrease of the output voltage can be restrained. Consequently, the constant-voltage circuit having an excellent direct-current characteristic and a high-speed response characteristic can be realized without continuous oscillation.

Further, the present invention is not limited to the specifically disclosed embodiment, and variations and modifications may be made without departing from the scope of the present invention.

The present invention is based on Japanese Priority Patent Application No. 2005-327739, filed on Nov. 11, 2005, with the Japanese Patent Office, the entire contents of which are hereby incorporated by reference.

What is claimed is:

1. A constant-voltage circuit which converts an input voltage input to an input terminal into a predetermined constant voltage and outputs the predetermined constant voltage from an output terminal, comprising:

an output voltage control transistor which outputs a current corresponding to an input control signal to the output terminal; and a control circuit section which detects a voltage of the output terminal and controls operations of the output voltage control transistor so that the detected voltage becomes a predetermined voltage; wherein the control circuit section amplifies a change of the voltage output from the output terminal, and makes the output voltage control transistor increase the output current for a predetermined period when the voltage of a signal obtained by amplification of the change is suddenly decreased at a speed more than a predetermined speed, the control circuit section includes an output voltage detecting circuit section which detects the voltage output from the output terminal and generates a voltage proportional to the detected voltage and outputs the generated proportional voltage;

a first control circuit section which controls the operations of the output voltage control transistor so that the proportional voltage becomes the reference voltage;

an amplifier circuit section which amplifies the change of the voltage output from the output terminal and outputs the amplified change through an output of the amplifier circuit section; and a second control circuit section including a coupling capacitor coupling the output of the amplifier circuit section to an input of the second control circuit section, wherein said second control circuit section makes the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal.

2. The constant-voltage circuit as claimed in claim 1, wherein:

the control circuit section further includes a reference voltage generating circuit section which generates a predetermined reference voltage and outputs the predetermined reference voltage.

3. The constant-voltage circuit as claimed in claim 1, wherein:

the output voltage control transistor and the control circuit section are integrated into one IC.

4. The constant-voltage circuit as claimed in claim 1, wherein:

the control circuit section is integrated into one IC.

5. The constant-voltage circuit as claimed in claim 1, wherein:

the second control circuit section amplifies only alternating-current components of the signal output from the amplifier circuit section.

6. The constant-voltage circuit as claimed in claim 1, wherein:

when an output signal from the amplifier circuit section is suddenly changed, the second control circuit section controls the operations of the output voltage control transistor for a predetermined period to increase the output voltage at the output terminal.

7. A constant-voltage circuit which converts an input voltage input to an input terminal into a predetermined constant voltage and outputs the predetermined constant voltage from an output terminal, comprising:

an output voltage control transistor which outputs a current corresponding to an input control signal to the output terminal; and a control circuit section which detects a voltage of the output terminal and controls operations of the output voltage control transistor so that the detected voltage becomes a predetermined voltage;

wherein the control circuit section amplifies a change of the voltage output from the output terminal, and makes the output voltage control transistor increase the output current for a predetermined period when the voltage of a signal obtained by amplification of the change is suddenly decreased at a speed more than a predetermined speed, wherein the control circuit section includes a reference voltage generating circuit section which generates a predetermined reference voltage and outputs the predetermined reference voltage, an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change through an output of the amplifier circuit section, and a second control circuit section including coupling capacitor coupling the output of the amplifier circuit section to an input of the second control circuit section, wherein said second control circuit section makes the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal; and wherein the amplifier circuit section detects alternating-current components of the change of the voltage output from the output terminal, amplifies the detected alternating-current components, and outputs the amplified components.

8. A constant-voltage circuit which converts an input voltage input to an input terminal into a predetermined constant voltage and outputs the predetermined constant voltage from an output terminal, comprising:

an output voltage control transistor which outputs a current corresponding to an input control signal to the Output terminal; and a control circuit section which detects a voltage of the output terminal and controls operations of the output voltage control transistor so that the detected voltage becomes a predetermined voltage;

wherein the control circuit section amplifies a change of the voltage output from the output terminal, and makes the output voltage control transistor increase the output current for a predetermined period when the voltage of a signal obtained by amplification of the change is suddenly decreased at a speed more than a predetermined speed, wherein the control circuit section includes a reference voltage generating circuit section which generates a predetermined reference voltage and outputs the predetermined reference voltage, an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output front the output terminal and outputs the amplified change through an output of the amplifier circuit section, and a second control circuit section including a coupling capacitor coupling the output of the amplifier circuit section to an input of the second control circuit section, wherein said second control circuit section makes the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal; and wherein the amplifier circuit section includes a first differential amplifier circuit to whose first input terminal a predetermined first bias voltage is input and which outputs a signal to the second control circuit section so that a voltage of a second input terminal becomes the predetermined first bias voltage;

a first capacitor connected between the second input terminal of the first differential amplifier circuit and the output terminal; and a first resistor connected between the first and second input terminals of the first differential amplifier circuit.

9. The constant-voltage circuit as claimed in claim 8, wherein:

the first differential amplifier circuit includes transistors which form a differential pair and an offset value is set in at least one of the transistors, so that when the change of the voltage of the output terminal is a predetermined value or less, a current flowing into one transistor becomes smaller than a current flowing into the other transistor.

10. The constant-voltage circuit as claimed in claim 9 wherein:

the offset value of the transistor in the first differential amplifier circuit is corrected so that dispersion of the response speed of the amplifier circuit section caused by dispersion properties of elements of the amplifier circuit section in manufacturing processes is corrected.

11. A constant-voltage circuit which converts an input voltage input to an input terminal into a predetermined constant voltage and outputs the predetermined constant voltage from an output terminal, comprising:

an output voltage control transistor which outputs a current corresponding to an input control signal to the output terminal; and a control circuit section which detects a voltage of the output terminal and controls operations of the output voltage control transistor so that the detected voltage becomes a predetermined voltage;

wherein the control circuit section amplifies a change of the voltage output from the output terminal, and makes the output voltage control transistor increase the output current for a predetermined period when the voltage of a signal obtained by amplification of the change is suddenly decreased at a speed more than a predetermined speed, wherein the control circuit section includes a reference voltage generating circuit section which generates a predetermined reference voltage and outputs the predetermined reference voltage, an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change, and a second control circuit section which makes the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal; and wherein the second control circuit section includes a second differential amplifier circuit to whose first input terminal a predetermined first bias voltage is input and which controls the output voltage control transistor so that a voltage of a second input terminal becomes the predetermined first bias voltage;

a second capacitor connected between the second input terminal of the second differential amplifier circuit and the output terminal of the amplifier circuit section; and a second resistor connected between the first and second input terminals of the second differential amplifier circuit.

12. The constant-voltage circuit as claimed in claim 11, wherein:

the second differential amplifier circuit includes transistors which form a differential pair and an offset value is set in at least one of the transistors, so that when the change of the voltage of the output terminal is a predetermined value or less, a current flowing into one transistor becomes smaller than a current that flowing into the other transistor.

13. A controlling method of a constant-voltage circuit which includes an output voltage control transistor for outputting a current corresponding to an input control signal to an output terminal of the constant-voltage circuit and a control circuit section for detecting a voltage of the output terminal and for controlling operations of the output voltage control transistor so that the detected voltage becomes a predetermined voltage and converts an input voltage input to an input terminal into a predetermined constant voltage and outputs the predetermined constant voltage from the output terminal, the control circuit section including an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change through an output of the amplifier circuit section, and a second control circuit section to make the output voltage control transistor increase the output current for the predetermined period when the voltage of the signal output from the amplifier circuit section is suddenly decreased at a speed more than a predetermined speed, and whose response speed is eater than that of the first control circuit section for the change of the voltage output from the output terminal, said method comprising the steps of:

providing a coupling capacitor coupling the output of the amplifier circuit section to an input of the second control circuit section;

amplifying a change of the voltage output from the output terminal; and making the output voltage control transistor increase the output current for a predetermined period when the voltage of a signal obtained by amplification of the change is suddenly decreased at a speed more than a predetermined speed.

14. A controlling method of a constant-voltage circuit which includes an output voltage control transistor for outputting a current corresponding to an input control signal to an output terminal of the constant-voltage circuit and a control circuit section for detecting a voltage of the output terminal and for controlling operations of the output voltage control transistor so that the detected voltage becomes a predetermined voltage and converts an input voltage input to an input terminal into a predetermined constant voltage and outputs the predetermined constant voltage from the output terminal, the control circuit section including an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change through an output of the amplifier circuit section, and a second control circuit section to make the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal, said method comprising the steps of:

providing a coupling capacitor coupling the output of the amplifier circuit section to an input of the second control circuit section;

amplifying a change of the voltage output from the output terminal; and making the output voltage control transistor increase the output current for a predetermined period when the voltage of a signal obtained by amplification of the change is suddenly decreased at a speed more than a predetermined speed, wherein alternating-current components of the change of the voltage output from the output terminal are detected, and the change of the voltage output from the output terminal is amplified by amplifying the detected alternating-current components.

15. A controlling method of a constant-voltage circuit which includes an output voltage control transistor for outputting a current corresponding to an input control signal to an output terminal of the constant-voltage circuit and a control circuit section for detecting a voltage of the output terminal and for controlling operations of the output voltage control transistor so that the detected voltage becomes a predetermined voltage and converts an input voltage input to an input terminal into a predetermined constant voltage and outputs the predetermined constant voltage from the output terminal, the control circuit section including an output voltage detecting circuit section which detects the voltage output from the output terminal and generates a voltage proportional to the detected voltage and outputs the generated proportional voltage, a first control circuit section which controls the operations of the output voltage control transistor so that the proportional voltage becomes the reference voltage, an amplifier circuit section which amplifies the change of the voltage output from the output terminal and outputs the amplified change through an output of the amplifier circuit section, and a second control circuit section to make the output voltage control transistor increase the output current for the predetermined period when the voltage of the signal output from the amplifier circuit section is suddenly decreased at a speed more than a predetermined speed, and whose response speed is greater than that of the first control circuit section for the change of the voltage output from the output terminal, said method comprising the steps of:

providing a coupling capacitor coupling the output of the amplifier circuit section to an input of the second control circuit section;

amplifying a change of the voltage output from the output terminal; and making the output voltage control transistor increase the output current for a predetermined period when the voltage of a signal obtained by amplification of the change is suddenly decreased at a speed more than a predetermined speed, wherein alternating-current components of the change of the voltage of the signal obtained by amplification are detected, and when a sudden decrease of the voltage of the signal obtained by amplification of the change at the speed more than the predetermined speed is detected from the detected alternating-current components, the output voltage control transistor is made to increase the output current for a predetermined period.

* * * * *